United States Patent [19]
Vogelsang

[11] Patent Number: 4,474,270
[45] Date of Patent: Oct. 2, 1984

[54] ADJUSTABLE HYDRODYNAMIC BRAKE

[75] Inventor: Klaus Vogelsang, Crailsheim, Fed. Rep. of Germany

[73] Assignee: Voith Turbo GmbH & Co. KG, Crailsheim, Fed. Rep. of Germany

[21] Appl. No.: 364,572

[22] Filed: Apr. 1, 1982

[30] Foreign Application Priority Data

Apr. 3, 1981 [DE] Fed. Rep. of Germany ....... 3113408

[51] Int. Cl.³ ............................................. F16D 57/04
[52] U.S. Cl. .................................... 188/296; 188/290
[58] Field of Search .............................. 188/290–296, 188/274; 192/3.23, 3.24, 4 B, 12 A, 3.21; 60/330, 342, 343, 332–334, 337, 352, 353

[56] References Cited

U.S. PATENT DOCUMENTS 3,744,598 7/1973 Hanke et al. ...................... 188/296
3,888,335 6/1975 Hanke ................................ 188/290

FOREIGN PATENT DOCUMENTS 2096269 10/1982 United Kingdom ............... 188/296

Primary Examiner—Douglas C. Butler
Attorney, Agent, or Firm—Kuhn Muller and Bazerman

[57] ABSTRACT

In a hydrodynamic brake, forming an energy converting mechanism and used for example in connection with heat-exchangers in the utilization of wind-power installations, the torque characteristic of the hydrodynamic brake is adapted to suit the torque characteristic of the power source by making the stator radially displaceable into a position in which its axis is off-center from the axis of the rotor. The stator is eccentrically secured on a shaft and by rotatably mounting the shaft, in the housing, eccentrically of the rotor. In an alternative embodiment, the stator is guided in a rectilinear guide permitting radial displacement.

8 Claims, 7 Drawing Figures

ADJUSTABLE HYDRODYNAMIC BRAKE

BACKGROUND

The invention concerns a hydrodynamic brake having a rotor and a stator which are arranged in a fixed housing having inlet and outlet connections for hydraulic fluid.

The use of such hydrodynamic brakes as energy converting means in connection with heat exchangers in wind-power installations is known. In such systems, it is desirable to be able to adapt the torque characteristic of the hydrodynamic brake to that of the wind-power installation or other power source. Such adaptation can be achieved by, for example, altering the state of fill of the housing. However, in the case of the said applications and with closed-cycle systems, such change in the state of fill suffers from the disadvantage that it is difficult to control. The brake cannot be regulated at the high pressure that normally prevails in such systems.

Variation of the torque characteristic by means of baffles which are inserted between the rotor and the stator is also known. Such baffles have the disadvantage that they are pressed against the stator by the pressure forces occurring in the brake. These pressure forces are difficult to control. Furthermore, the constructions concerned are relatively complicated. A further known way of influencing the torque characteristic consists in altering the axial distance between the stator and the rotor within the common housing. In this arrangement, a relatively large displacement is necessary in order to enable the so-called K-value of the hydrodynamic brake to be adapted to suit the wind wheel or other power source.

SUMMARY OF THE INVENTION

The object of the present invention is to provide a hydrodynamic brake, of the type described, that permits a substantial change in the torque characteristic by using a simple means having small dimensions.

According to the invention, there is provided a hydrodynamic brake comprising a bladed rotor and a bladed stator arranged in a fixed housing having inlet and outlet connections for hydraulic fluid, the stator being mounted in a position, or mounted for movement into a position, in which its axis is offset from the axis of the rotor.

In some constructions, according to the invention, the stator is secured eccentrically on a shaft which is rotatably mounted eccentrically of the rotor in the housing, the stator and the rotor being in alignment in one position. By simply turning the stator shaft, the stator is displaced radially relative to the rotor. Advantageously, the maximum distance of radial displacement corresponds substantially to the radial blade-height. Therefore, in a preferred embodiment of the invention, the stator is secured to the stator in a position in which it is offset by a distance equal to half of the radial blade-height, the shaft being mounted in the housing in a position in which it is offset from the axis of the rotor by the same amount. When the stator shaft is turned through 180-degrees, the stator is radially displaced to an extent equal to the blade-height.

In some cases it may be desirable, for example for manufacturing reasons, to use for the stator the same blades as for the rotor to provide the possibility of central attachment of the blades to the shaft. In this case and in a further possible embodiment, the stator is fixed on a crank-pin on the shaft.

Where the hydrodynamic braked is to be used in conjunction with a wind wheel having fixed blades, the brake needs to be adjusted only once to the wind wheel. In this case, the stator may advantageously be displaceable in a radially rectilinear manner in guides and may be secured by means of screws, for example. After adjustment has been carried out, the screws are tightened, and the stator can remain in the position in which it is set, once and for all. The brake of the invention is suitable for other cases of stationary use and for motor vehicles. In the last-mentioned case, displacement of the stator into the eccentric position for avoiding windage losses is carried out when the brake is not operating and is emptied.

Thus, in accordance with the invention, a hydrodynamic brake arrangement is provided which includes a fixed housing having inlet and outlet connections for permitting the passage of a hydraulic fluid therethrough, a bladed stator and a bladed rotor, mounted in the housing for rotation, each having a blade extended radially relative to the axis of rotation, wherein the bladed stator is positioned in the housing opposite the bladed rotor with the axis of rotation of the stator and rotor being radially offset relative to each other.

DETAILED DESCRIPTION

Figure 1:
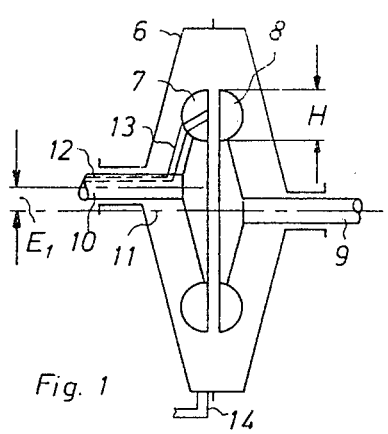
FIG. 1 illustrates a schematic sectional view of a hydrodynamic brake, in accordance with the invention, wherein the rotor and the stator are set in an optimum correlation.

Referring now to the drawings in particular, wherein like reference characters illustrate like or corresponding parts throughout the several views, there is shown in FIG. 1, a stator 7, rotor 8 and rotor-shaft 9 of hydrodynamic brake are arranged in a casing or housing 6. The longitudinal shaft axis of a shaft 10 of the stator 7 is offset from a central axis 11 of the stator by an amount $E_1$.

Hydraulic fluid acting as a pressure medium is fed into the casing through a pipe 12 in the stator shaft 10 and thence through a pipe 13. A pipe 14, leading out of the housing 6, serves to discharge the pressure medium.

In the illustrated example, the longitudinal shaft axis of the stator shaft 10 is displaced from the central axis 11 of the stator by an amount $E_1 = H/2$, wherein H is the blade-height. In the housing 6, the stator shaft 10 is likewise displaced from the central axis 9 of the rotor (common with the longitudinal axis of shaft) by the same amount $E_2 = E_1 = H/2$.

Figure 2:
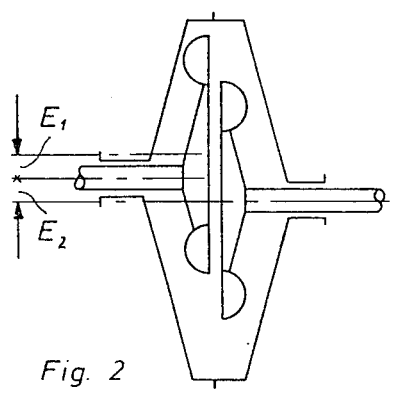
FIG. 2 schematically illustrates the brake of FIG. 1 in a correlation resulting in the flattest torque curve.
Figure 3:
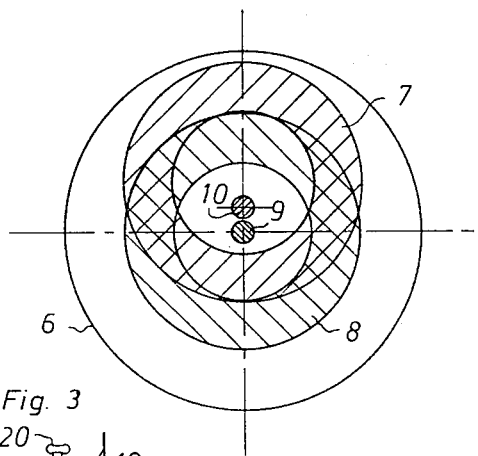
FIG. 3 is a superposed cross-sectional view illustrating the overlap of the stator and rotor in the FIG. 2 position.

If the stator axis is now turned through 180° (by turning means not shown, which hold stator shaft 10), the position shown in FIG. 2 is reached wherein the rotor and the stator are radially displaced from each other by the maximum amount. This position is illustrated diagrammatically in FIG. 3, viewed in the axial direction. Because of the two eccentricities $E_1$ and $E_2$, an overall radial displacement to the extent of $E_1 + E_2 = H$ results.

Figure 4:
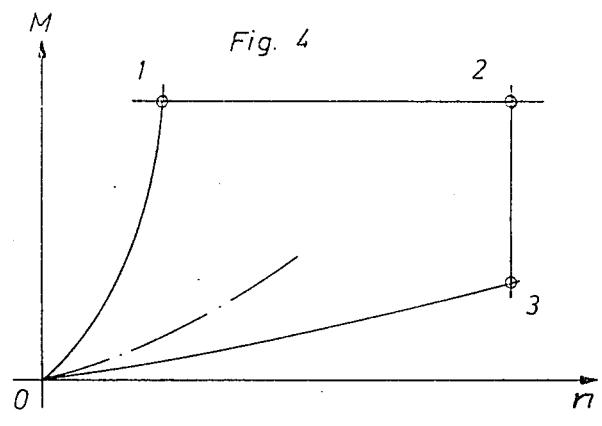
FIG. 4 is a graph showing the change in torque between the two extreme relative positions of the stator and the rotor.

The curve shown in FIG. 4 illustrates the change in torque (ordinate) with speed of revolution (abscissa). In the position of the stator and the rotor as shown in FIG. 1, the optimum change in torque as shown by curve O-1 is obtained, and in the position shown in FIG. 2, the change in torque as shown by the flat curve O-3 results. In the intermediate positions, a curve which lies between these two curves is obtained. The performance graph is limited at the top by the line 1-2 representing the maximum permissible internal pressure in the hydrodynamic brake. The line 2-3 indicates the maximum permissible speed of revolution.

Figure 5:
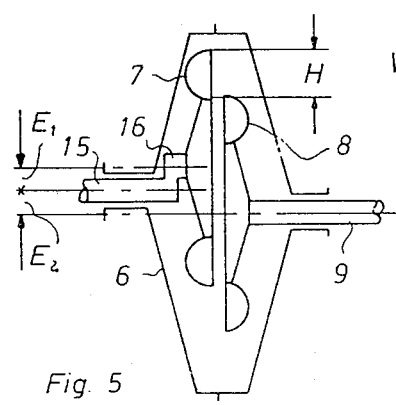
FIG. 5 illustrates, in a schematic longitudinal section, an alternative form of brake to the invention.

In an alternative embodiment shown in FIG. 5, the stator 7 (shown in its fully displaced position) is secured to a crankshaft 15, which is rotatable by 180° (by turning means, not shown, which hold the crankshaft 15) in the housing 6 and is mounted off-center from the axis 9 of the rotor shaft by a distance $E_2$. In this arrangement, the stator 7 is secured centrally on the pin 16 of the crankshaft. The eccentricity of the axis of the crankshaft in relation to the center of the crank pin is $E_1 = E_2$, and $E_1 + E_2$ is again equal to the blade-height H. The pipes for supplying and discharging the pressurized medium are not illustrated here, but they can be arranged in precisely the same manner as shown in the embodiment of FIG. 1.

Figure 6:
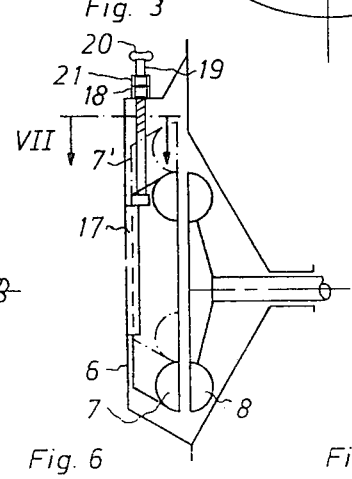
FIG. 6 shows in axial section, a further alternative form of brake of the invention wherein the stator can be displaced linearly and radially and can be fixedly set.
Figure 7:
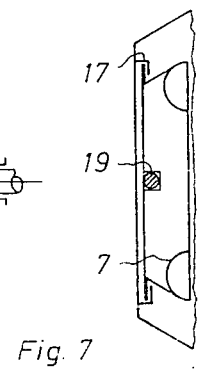
FIG. 7 is a fragmentary section along the line VII—VII of FIG. 6.

In the form of construction shown in FIGS. 6 and 7, the stator 7 is mounted at its rearward side in rectilinear guides 17 so as to be displaceable radially with respect to the rotor axis 9. An adjusting screw 19 is engaged in an internally threaded eye 18 on the stator but cannot be displaced axially of itself. By turning a winged end 20 of the screw 19, the stator can be displaced from the fully extracted position into the position 7 shown by the chain line, and it can be firmly held in the adjusted position by means of a lock nut 21. This arrangement is particularly suitable for wind wheels having fixed blades, and the stator does not require to be further displaced once it has been suitably set.

In the arrangements shown in FIGS. 1 to 3 and FIG. 5, it is of course also possible to secure the stator once and for all in a selected position of adjustment.

As shown in the FIGS., the respective central axis and the axis of rotation of each of the stator 7 and rotor 8 are parallel and the bladed rotor and bladed stator are arranged in opposed relationship.

Thus, in accordance with the invention, there is provided a hydrodynamic brake comprising a bladed rotor 8 and a bladed stator 7 arranged in a fixed housing 6 having inlet and outlet connections for hydraulic fluid, the stator 7 being mounted in a position, or mounted for movement into a position, in which its axis is offset from the axis of the rotor. The maximum distance of radial displacement of the stator is substantially equal to the radial blade height.

In accordance with one embodiment, the stator is secured on a shaft which is radially offset from the axis of the stator by a distance substantially equal to half the radial blade height and which is mounted in the housing 6 in a position offset from the axis of the rotor by the same amount.

In accordance with another embodiment, the stator is secured eccentrically on a shaft which is rotatably mounted with its axis disposed eccentrically with respect to that of the rotor, the axis of the stator and the rotor being alignment in one position of rotational adjustment of the shaft. In this embodiment, the stator is preferably secured on a crank-pin connected to the shaft. In accordance with a feature of the invention, the stator is guided in rectilinearly-extending guide means which guides the stator for radial displacement with respect to the axis of the rotor.

What is claimed is

1. A hydrodynamic brake arrangement comprising a fixed housing, the housing having an inlet connection and an outlet connection for permitting the passage of a hydraulic fluid therethrough; a rotor, mounted in the housing for rotation, having a rotor blade radially extended relative to the axis of rotation of the rotor; a stator, mounted in the housing, having a stator blade radially extended relative to the axis of the stator; and the stator being positioned in the housing opposite the rotor with the axis of the stator being radially displaceable relative to the axis of the rotor.

2. A hydrodynamic brake arrangement according to claim 1 wherein the maximum distance of radial displacement possible between the stator and rotor is substantially equal to the radial height of the stator blade.

3. A hydrodynamic brake arrangement according to claim 1 or 2 further comprising a stator shaft supporting the stator; the stator being eccentrically secured to the stator shaft; the axis of the stator shaft being radially displaced from the axis of the rotor; the stator and the rotor being axially aligned in one position of the stator shaft.

4. A hydrodynamic brake arrangement according to claim 3 further comprising a crank pin interconnecting the stator and the stator shaft.

5. A hydrodynamic brake arrangement according to claim 2 further comprising a stator shaft supporting the stator; the axis of the stator shaft being radially displaced from the axis of the rotor by a distance substantially equal to one-half the radial height of the stator blade.

6. A hydrodynamic brake arrangement according to claim 5 wherein the stator is eccentrically secured to the stator shaft; and the axis of the stator and the axis of the rotor being axially aligned in one position of the stator shaft.

7. A hydrodynamic brake arrangement according to claim 5 or 6 further comprising a crank pin interconnecting the stator to the stator shaft.

8. A hydrodynamic brake arrangement according to claim 1 further comprising means for rectilinearly guiding the stator for radial displacement with respect to the axis of the rotor.

* * * * *